(12) United States Patent
Park (10) Patent No.: US 11,882,622 B2
(45) Date of Patent: Jan. 23, 2024

(54) EDGE COMPUTING MANAGEMENT DEVICE AND OPERATING METHOD OF EDGE COMPUTING MANAGEMENT DEVICE

(71) Applicant: SK TELECOM CO., LTD., Seoul (KR)

(72) Inventor: Min Cheol Park, Seoul (KR)

(73) Assignee: SK Telecom Co., LTD., Seoul (KR)

(*) Notice: Subject to any disclaimer, the term of this patent is extended or adjusted under 35 U.S.C. 154(b) by 220 days.

(21) Appl. No.: 17/397,023

(22) Filed: Aug. 9, 2021

(65) Prior Publication Data
US 2021/0368324 A1    Nov. 25, 2021

Related U.S. Application Data

(63) Continuation-in-part of application No. PCT/KR2020/009046, filed on Jul. 9, 2020.

(30) Foreign Application Priority Data

Jul. 12, 2019 (KR) .......................... 10-2019-0084441

(51) Int. Cl.
| | | |
|---|---|---|
| *H04W 8/06* | (2009.01) | |
| *H04W 76/10* | (2018.01) | |
| *H04W 12/06* | (2021.01) | |
| *H04L 61/4511* | (2022.01) | |
| *H04W 88/16* | (2009.01) | |

(52) U.S. Cl.
CPC ............ *H04W 8/06* (2013.01); *H04L 61/4511* (2022.05); *H04W 12/06* (2013.01); *H04W 76/10* (2018.02); *H04W 88/16* (2013.01)

(58) Field of Classification Search
CPC ......... H04W 8/06; H04W 8/12; H04W 76/10; H04W 12/06; H04W 88/16; H04W 12/08; H04L 61/4511
See application file for complete search history.

(56) References Cited

U.S. PATENT DOCUMENTS

| | | | |
|---|---|---|---|
| 11,044,605 B2* | 6/2021 | Huang | ................ H04L 61/4588 |
| 11,516,113 B2* | 11/2022 | Qian | ....................... H04L 45/24 |
| 2017/0347258 A1* | 11/2017 | Carbone | ............. H04L 65/1016 |
| 2019/0037398 A1* | 1/2019 | Eriksson | ............... H04W 76/10 |

(Continued)

FOREIGN PATENT DOCUMENTS

| | | |
|---|---|---|
| JP | 2016-523487 | 8/2016 |
| KR | 10-2013-0138501 | 12/2013 |

(Continued)

OTHER PUBLICATIONS

International Search Report dated Sep. 25, 2020 issued in Application No. PCT/KR2020/009046.

(Continued)

*Primary Examiner* — Khawar Iqbal
(74) *Attorney, Agent, or Firm* — KED & Associates LLP (57) ABSTRACT

The present disclosure relates to an edge computing (multi-access edge computing, MEC) technology and, to an edge computing management device and an operating method of an edge computing management device, which provide a data roaming service by utilizing an edge computing cloud (MEC cloud) that exists in a communication provider network.

14 Claims, 7 Drawing Sheets

(56) References Cited

U.S. PATENT DOCUMENTS

| | | | | |
|---|---|---|---|---|
| 2020/0359213 | A1* | 11/2020 | Huang | H04W 12/06 |
| 2021/0099848 | A1* | 4/2021 | Ruan | H04W 36/0079 |
| 2021/0258771 | A1* | 8/2021 | Dodd-Noble | H04W 4/025 |
| 2021/0337611 | A1* | 10/2021 | Dodd-Noble | H04W 8/065 |
| 2022/0159501 | A1* | 5/2022 | Chou | H04L 41/122 |
| 2022/0240213 | A1* | 7/2022 | Ly | H04W 60/04 |
| 2022/0345420 | A1* | 10/2022 | Guim Bernat | G06F 9/5077 |
| 2022/0417122 | A1* | 12/2022 | Chou | H04L 41/5051 |

FOREIGN PATENT DOCUMENTS

| | | | |
|---|---|---|---|
| KR | 10-2019-0058763 | 5/2019 | |
| KR | 10-2019-0072326 | 6/2019 | |
| WO | WO-2017098810 A1 * | 6/2017 | H04W 88/18 |

OTHER PUBLICATIONS

Korean Office Action dated Jun. 19, 2020 issued in Application No. 10-2019-0084441 (English translation attached).

* cited by examiner

<GTP-C message>

| Octets | Bits | |
|---|---|---|
| 1 | GTP-C Header with T=0, Message Type=254,255 | Message type field |
| 2 | Message Type 254: MEC APN Allocation Request (From MEO) | |
| 3 | Message Type 255: MEC APN Allocation Response (From MME) | |
| 4 | | |
| 5 | | |
| 6 | | |
| 7 | | |
| 8 | | |
| 9~258 | APN address (assume Maximum Length of 250) | APN address field |
| 259~262 | MCC | Communication service provider identification field |
| 263~266 | MNC | |
| 267 | Whether to register or delete APN (0 for registration, and 1 for deletion) | Message definition field |

EDGE COMPUTING MANAGEMENT DEVICE AND OPERATING METHOD OF EDGE COMPUTING MANAGEMENT DEVICE

CROSS-REFERENCE TO RELATED PATENT APPLICATIONS

This application is a Continuation-in-part of PCT Application No. PCT/KR2020/009046, filed Jul. 9, 2020, which claims priority to Korean Patent Application No. 10-2019-0084441, filed Jul. 12, 2019, whose entire disclosures are hereby incorporated by reference.

BACKGROUND OF THE INVENTION

1. Field of the Invention

The present disclosure relates to an edge computing (MEC, multi-access edge computing) technology and, particularly, to a method for providing a data roaming service by using an edge computing cloud (MEC cloud) existing in a communication service provider network.

2. Description of the Prior Art

In a mobile communication service, when a subscriber enters a visited network (VPLMN, visit public land mobile network) service area outside a home network (HPLMN, home public land mobile network) service area, to which the subscriber is subscribed, such as a case of traveling overseas while carrying a subscriber terminal, a roaming service is provided by mutual agreements between mobile communication service providers and interworking between systems, wherein the roaming service provides mobile phone outgoing and incoming services to both subscribers in both service areas.

In addition to a basic voice call and a short message service (SMS), the roaming service also provides a data roaming service.

When a data roaming service is provided to a terminal located in a visited network in a conventional LTE (4G) communication system, data traffic of the terminal needs to be serviced via a PDN gateway (PGW) located in a home network (HPLMN) of a host country, and therefore there is a problem that the quality of data traffic is not guaranteed according to the distance between countries and the quality of an interworking network.

Recently, in an environment where evolution from a 4G communication system to a 5G communication system is actively progressing, implementation of a multi-access edge computing (MEC) technology is being attempted to accommodate ultra-low latency and large-capacity applications by arranging computing for application services near a terminal.

When the edge computing technology is commercialized, it may also be expected to provide the data roaming service on the basis of an edge computing cloud (MEC cloud) implemented by a communication service provider network.

Accordingly, the present disclosure is to implement a new data roaming service based on an edge computing cloud to solve a problem of an existing technology where the quality of data traffic cannot be guaranteed according to the distance between countries and the quality of the interworking network.

SUMMARY OF THE INVENTION

The present disclosure has been created in view of the aforementioned circumstances, and an aspect of the present disclosure is to provide a data roaming service by using an edge computing cloud (MEC cloud) implemented in a communication service provider network according to applying of the multi-access edge computing (MEC) technology.

An edge computing management device according to an embodiment of the present disclosure to achieve the aspect includes: a generation unit configured to generate a virtual gateway for another communication service provider in an edge computing cloud of a visited network (VPLMN), and assign access information related to the virtual gateway; and a registration unit configured to register the access information in the visited network, thereby enabling a session for data traffic transfer to be established between a terminal and the virtual gateway according to the access information when the terminal accesses the visited network to use a data roaming service.

Specifically, the generation unit may assign a first APN address, which is an APN address in the visited network for the another communication service provider, and an IP address mapped to the first APN address, so as to generate the virtual gateway in the edge computing cloud.

Specifically, the registration unit may match the first APN address to service provider identification information of the another communication service provider so as to register the same in a mobility management entity (MME) of the visited network, and may register mapping information between the first APN address and the IP address in a domain name system (DNS) server of the visited network.

Specifically, when the service provider identification information of the another communication service provider is identified from the terminal accessing the visited network, the MME may acquire an IP address matching the first APN address, instead of a second APN address that is an APN address in a home network (HPLMN) of the another communication service provider requested by the terminal, from the DNS server so as to establish a session between the terminal and the virtual gateway.

Specifically, when it is identified that the terminal accesses the visited network, the MME may authenticate the terminal in association with the home network (HPLMN) of the another communication service provider, and when the terminal has been authenticated, the MME may acquire an IP address matching the first APN address from the DNS server, so as to establish a session between the terminal and the virtual gateway.

Specifically, the registration unit may transmit a GPRS tunneling protocol-control (GTP-C) message to or receive the same from the MME, wherein the GTP-C message includes at least one among a message type field for distinguishing message transmission to the MME or message reception from the MME, an APN address field into which the first APN address is inserted, a communication service provider identification field into which the service provider identification information is inserted, and a message definition field for distinguishing that the message is for registration or deletion of the first APN address.

Specifically, the edge computing management device may further include a management unit configured to adjust, on the basis of a result of monitoring data traffic between the terminal and virtual gateway, at least one among the number of the virtual gateways, the number of IP addresses assignable to the terminal from the virtual gateways, and a weight factor that is a weight for selection of the virtual gateway when a data roaming service is provided.

Specifically, the management unit may determine, on the basis of at least one of a load state of the virtual gateway and a capacity of the edge computing cloud, whether session establishment is possible using the virtual gateway, and when it is determined that session establishment using the virtual gateway is not possible, the management unit may enable session establishment in association with a home network of the another communication service provider with respect to the data roaming service required in the visited network.

An operating method of an edge computing management device according to an embodiment of the present disclosure to achieve the aspect includes: generating a virtual gateway for another communication service provider in an edge computing cloud of a visited network (VPLMN), and assigning access information related to the virtual gateway; and when a terminal accesses the visited network to use a data roaming service, registering the access information in the visited network, thereby enabling establishment of a session for data traffic transfer between the terminal and the virtual gateway according to the access information.

Specifically, the generating of the virtual gateway may include assigning a first APN address, which is an APN address in the visited network for the another communication service provider, and an IP address mapped to the first APN address, so as to generate the virtual gateway in the edge computing cloud.

Specifically, the registering of the access information may include registering the first APN address matched to service provider identification information of the another communication service provider in a mobility management entity (MME) of the visited network, and registering mapping information between the first APN address and the IP address in a domain name system (DNS) server of the visited network.

Specifically, when the service provider identification information of the another communication service provider is identified from the terminal accessing the visited network, the MME may acquire, from the DNS server, an IP address matching the first APN address instead of a second APN address, which is an APN address in a home network (HPLMN) of the another communication service provider requested by the terminal, so as to establish a session between the terminal and the virtual gateway.

Specifically, the registering of the access information may include transmitting a GPRS tunneling protocol-control (GTP-C) message to the MME or receiving the GTP-C message from the MME, wherein the GTP-C message may comprise at least one of a message type field for distinguishing message transmission to the MME or message reception from the MME, an APN address field into which the first APN address is inserted, a communication service provider identification field into which the service provider identification information is inserted, and a message definition field for distinguishing that the message is for registration or deletion of the first APN address.

Specifically, the operating method of the edge computing management device may further include adjusting, on the basis of a result of monitoring data traffic between the terminal and the virtual gateway, at least one of the number of the virtual gateways, the number of IP addresses assignable to the terminal by the virtual gateways, and a weight factor that is a weight for selection of the virtual gateway when the data roaming service is provided.

Specifically, the adjustment may include determining whether session establishment is possible using the virtual gateway on the basis of at least one of a load state of the virtual gateway and a capacity of the edge computing cloud; and enabling session establishment in association with a home network of the another communication service provider with respect to the data roaming service required in the visited network when it is determined that session establishment using the virtual gateway is not possible.

A computer readable storage medium according to an embodiment of the present disclosure to achieve the aspect having stored therein a control program causing a computer to perform of generating a virtual gateway for another communication service provider in an edge computing cloud of a visited network (VPLMN), and assigning access information related to the virtual gateway; and registering the access information in the visited network, thereby a session for data traffic transfer to be established between a terminal and the virtual gateway according to the access information, when the terminal accesses the visited network to use a data roaming service.

Specifically, the generating may include assigning a first APN address, which is an APN address in the visited network for the another communication service provider, and an IP address mapped to the first APN address, so as to generate the virtual gateway in the edge computing cloud.

Specifically, the registering may include registering the first APN address matched to service provider identification information of the another communication service provider in a mobility management entity (MME) of the visited network, and registering mapping information between the first APN address and the IP address in a domain name system (DNS) server of the visited network.

Specifically, when the service provider identification information of the another communication service provider is identified from the terminal accessing the visited network, the MME may acquire an IP address matching the first APN address, instead of a second APN address that is an APN address in a home network (HPLMN) of the another communication service provider requested by the terminal, from the DNS server so as to establish a session between the terminal and the virtual gateway.

According to an edge computing management device and an operating method of the edge computing management device in the present disclosure, the quality of data traffic can be guaranteed irrespective of the distance between countries and the quality of an interworking network by providing a data roaming service to terminals in the visited network (VPLMN) using an edge computing cloud (MEC cloud) of the visited network (VPLMN) implemented according to applying of an edge computing (MEC, multi-access edge computing) technology.

DETAILED DESCRIPTION OF THE EXEMPLARY EMBODIMENTS

Hereinafter, preferred embodiments of the present disclosure will be described with reference to the accompanying drawings.

Figure 1:
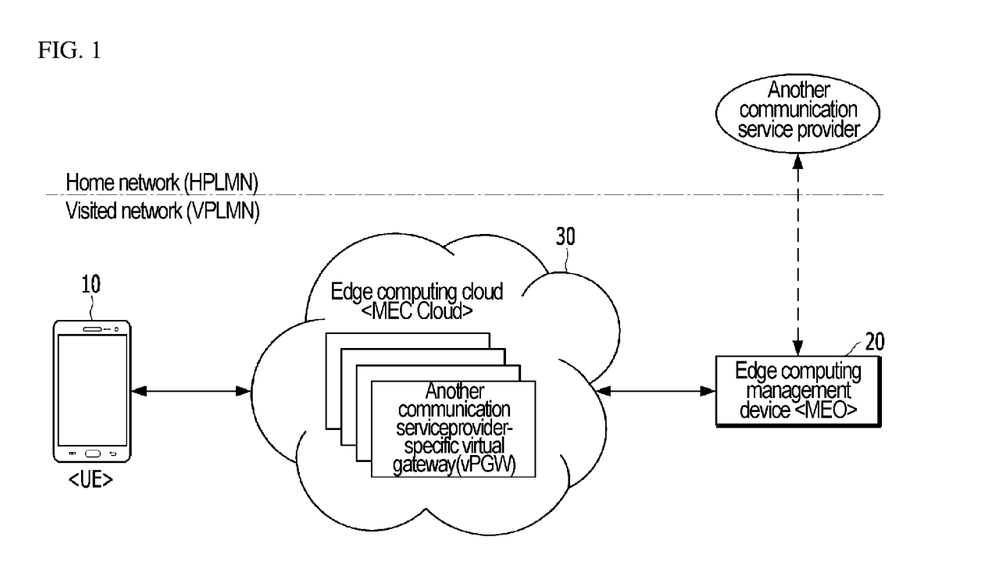
FIG. 1 is an exemplary diagram showing a data roaming service environment according to an embodiment of the present disclosure.

FIG. 1 shows a data roaming service environment according to an embodiment of the present disclosure.

An embodiment of the present disclosure deals with an edge computing (MEC, multi-access edge computing) technology for providing a data roaming service by using an edge computing cloud (MEC cloud) existing in a communication service provider network.

The communication service provider network may be divided into a home network (HPLMN, home public land mobile network) which is a service area of another communication service provider (e.g., a foreign communication service provider), and a visited network (VPLMN, visit public land mobile network) in which a terminal subscribed to a communication service of the another communication service provider uses a data roaming service outside the service area of the home network (HPLMN).

The communication service provider network may include all communication networks, to which the edge computing (MEC) technology is applicable, but in an embodiment of the present disclosure, an LTE (4G) communication system will be described as an example.

Accordingly, as shown in FIG. 1, the data roaming service environment according to an embodiment of the present disclosure may include an edge computing management device (MEO, MEC orchestrator) 20, wherein an edge computing management device generates a virtual gateway (vPGW) of another communication service provider for a data roaming service of a terminal 10 in an edge computing cloud 30 existing in a visited network (VPLMN) according to applying of the edge computing (MEC) technology.

The terminal 10 is an inbound terminal subscribed to a communication service of the another communication service provider, and may receive the data roaming service via a virtual gateway (vPGW) of the another communication service provider, which is generated in the edge computing cloud 30, when the terminal 10 enters the service area of the visited network (VPLMN).

That is, an embodiment of the present disclosure is significantly different in that, when the data roaming device is provided, the data traffic is serviced via the virtual gateway (vPGW) generated in the edge computing cloud 30 of the visited network (VPLMN) unlike a prior art where data traffic of the terminal 10 is serviced via a PDN gateway (PGW) located in a home network (HPLMN) of the another communication service provider.

Figure 2:
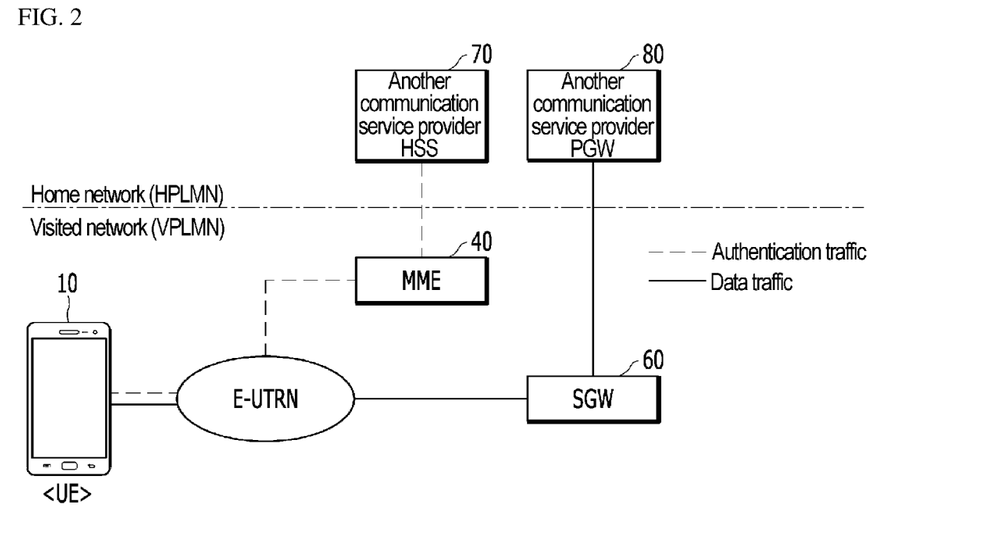
FIG. 2 is an exemplary diagram for describing a data roaming service environment according to a prior art.

In this regard, FIG. 2 schematically shows a conventional data roaming service environment.

As shown in FIG. 2, in a conventional data roaming service environment, when the terminal 10 accesses a visited network (VPLMN), a data roaming service may be provided to the terminal 10 by a mobility management entity (MME) 40 of the visited network (VPLMN) completing authentication in association with a home subscriber server (HSS) 70 located in a home network (HPLMN) of another communication service provider, and then establishing a session for data traffic transfer between a serving gateway (SGW) 60 of the visited network (VPLMN) and the home subscriber server (PGW) 70 located in the home network (HPLMN) of the another communication service provider.

As such, in the conventional data roaming service environment, the data traffic of the terminal 10 entering the visited network (VPLMN) needs to be serviced via the PGW 70 located in the home network (HPLMN) of the another communication service provider, and thus there is a problem that the quality of data traffic is not guaranteed at all according to the distance between countries and the quality of an interworking network.

Figure 3:
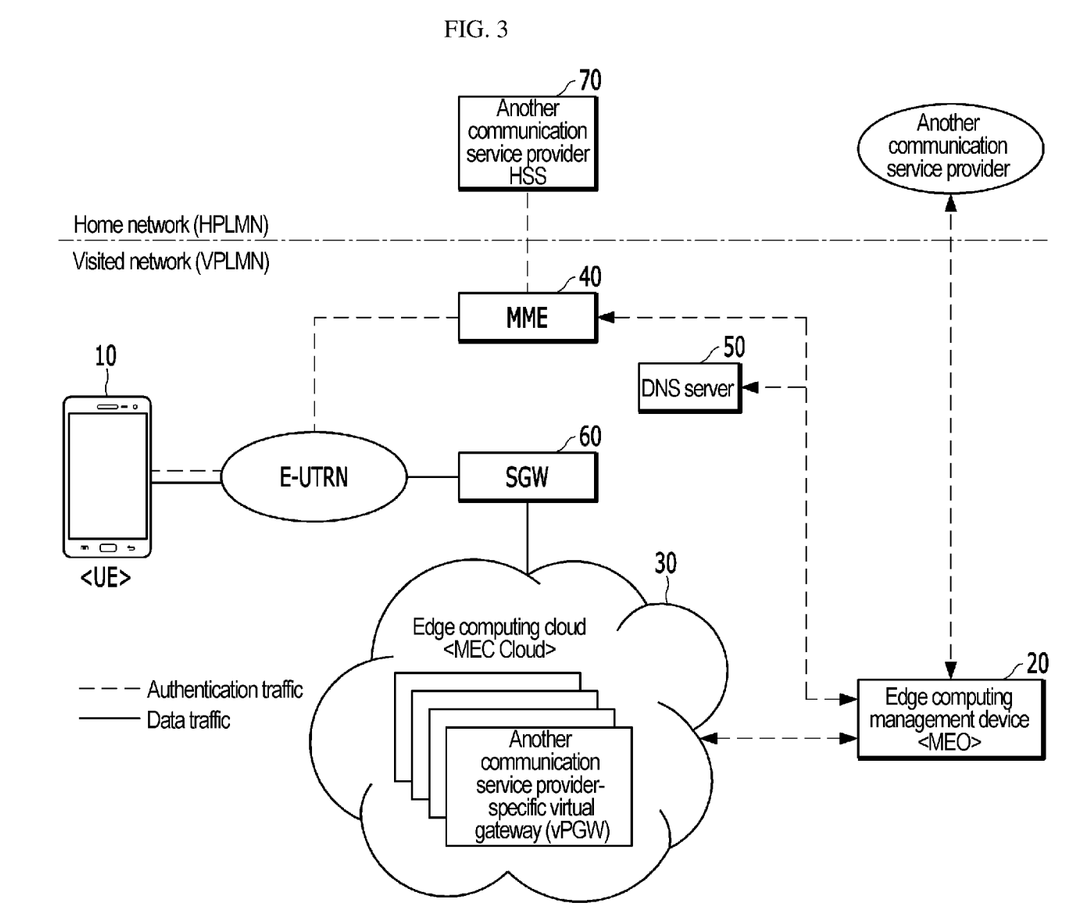
FIG. 3 is an exemplary diagram for describing the data roaming service environment in detail according to an embodiment of the present disclosure.

FIG. 3 shows the data roaming service environment according to an embodiment of the present disclosure in more detail.

As shown in FIG. 3, in the data roaming service environment according to an embodiment of the present disclosure, when the terminal 10 accesses the visited network (VPLMN), the data roaming service to the terminal 10 via the virtual gateway (vPGW) of the another communication service provider becomes possible by the MME 40 of the visited network (VPLMN) performing authentication in association with the home subscriber server (HSS) 70 located in the home network (HPLMN) of the another communication service provider, and when the terminal 10 has been authenticated, establishing a session for data traffic transfer between the serving gateway (SGW) 60 of the visited network (VPLMN) and the virtual gateway (vPGW) of the another communication service provider, which is generated in the edge computing cloud 30.

As described, in the data roaming service environment according to an embodiment of the present disclosure, unlike the prior art in which data traffic of the terminal 10 is serviced via a PDN gateway (PGW) located in a home network (HPLMN) of another communication service provider, it may be seen that data traffic is serviced via the virtual gateway (vPGW) generated in the edge computing cloud 30 of the visited network (VPLMN).

However, in order to provide the data roaming service to the terminal 10 via the virtual gateway (vPGW) generated in the edge computing cloud 30 as described above, a procedure of generating a virtual gateway (vPGW) of the another communication service provider in the edge computing cloud 30 and registering information relating thereto in a domain name system (DNS) server 50 and the MME 40 of the visited network (VPLMN) needs to precede.

Accordingly, hereinafter, a configuration of the edge computing management device 20 will be described in more detail, wherein the edge computing management device 20 is configured to generate a virtual gateway (vPGW) for the another communication service provider in the edge computing cloud 30 existing in the visited network (VPLMN), and register information related thereto in the DNS server 50 and the MME 40 of the visited network (VPLMN).

Figure 4:
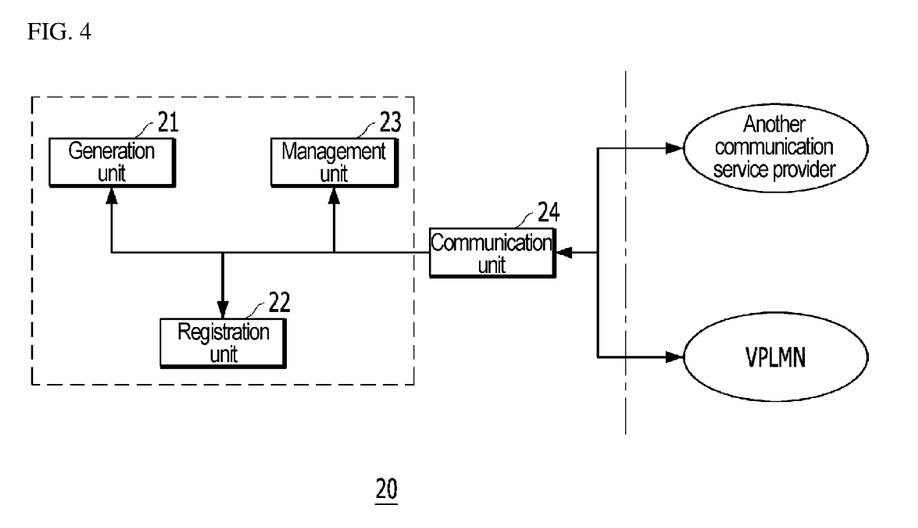
FIG. 4 is a schematic configuration diagram of an edge computing management device according to an embodiment of the present disclosure.

FIG. 4 schematically shows a configuration of the edge computing management device 20 according to an embodiment of the present disclosure.

As shown in FIG. 4, the edge computing management device 20 according to an embodiment of the present disclosure may include a generation unit 21 configured to generate a virtual gateway (vPGW) for another communication service provider, and a registration unit 22 configured to register a virtual gateway (vPGW) in a visited network (VPLMN).

The edge computing management device 20 according to an embodiment of the present disclosure may further include a management unit 23 configured to manage data traffic according to data roaming service use, in addition to the aforementioned elements.

All or at least some of the edge computing management device 20 may be implemented in a form of a hardware module or a software module, or may be implemented in a form in which a hardware module and a software module are combined.

The software module may be understood as, for example, an instruction executed by a processor configured to process an operation in the edge computing management device 20, and the instruction may be mounted in a separate memory within the edge computing management device 20.

The edge computing management device 20 according to an embodiment of the present disclosure may further include a communication unit 24, which is an RF module that is in charge of practical communication with network elements within a visited network (VPLMN) and another communication service provider, in additional to the aforementioned elements.

The communication unit 24 includes, for example, an antenna system, an RF transceiver, one or more amplifiers, a tuner, one or more oscillators, a digital signal processor, a codec chipset, and a memory, but is not limited thereto. The communication unit 24 may include any known circuit that performs as the above elements.

The edge computing management device 20 according to an embodiment of the present disclosure generates a virtual gateway (vPGW) for another communication service provider in the edge computing cloud 30 existing in the visited network (VPLMN) via the aforementioned elements, and enables a data roaming service via the virtual gateway (vPGW). Hereinafter, each element in the edge computing management device 20, which is to realize the data roaming service via the virtual gateway, will be described in more detail.

The generation unit 21 is configured to generate a virtual gateway (vPGW) for another communication service provider.

More specifically, the generation unit 21 is configured to assign access information in the edge computing cloud 30 with respect to another communication service provider, and generate a virtual gateway (vPGW) matching the access information assigned to the edge computing cloud 30, in response to a virtual gateway (vPGW) generation request from the another communication service provider.

To this end, the generation unit 21 provides the another communication service provider with a user interface (UI) related to virtual gateway (vPGW) generation, and allows the another communication service provider to input information necessary for virtual gateway (vPGW) generation via the UI.

The information necessary for virtual gateway (vPGW) generation may include, for example, CPU, memory, interface, and network acceleration support (PCI-PT or SR-IOV or DPDK) for the virtual gateway (vPGW), network topology information between VNFCs constituting the virtual gateway (vPGW), and the like.

In this way, the access information in the edge computing cloud 30, which is assigned to the another communication service provider, may include an access point name (APN) address (hereinafter, a first APN address) in the visited network (VPLMN) for the another communication service provider, and an IP address mapped to the first APN address.

Accordingly, the generation unit 21 may generate the virtual gateway (vPGW) for processing the data roaming service for the another communication service provider on the edge computing cloud 30, by assigning the first APN address in the visited network (VPLMN) for the another communication service provider and the IP address mapped to the first APN address, in response to the virtual gateway (vPGW) generation request from the another communication service provider.

In this way, the IP address assigned to the another communication service provider may include an IP address that matches one-to-one with the first APN address assigned to the another communication service provider, and an IP address pool which is a plurality of IP addresses assigned to terminals accessing the virtual gateway (vPGW) during the data roaming service.

The IP address pool and the first APN address assigned to the another communication service provider need to be injected in the virtual gateway (vPGW) during virtual gateway (vPGW) generation on the edge computing cloud 30.

In this case, an applied injection scheme may include a scheme of using Cloud-init which is a standard framework that injects additional information into a VM, a scheme of generating and mounting a light volume including the IP address pool and the first APN address when the virtual gateway (vPGW) operates based on a container, a scheme of injecting the IP address pool and the first APN address by using a separate API provided by the virtual gateway (vPGW), and the like.

As described above, it may be referred to later that not only the first APN address but also a second APN address are assigned to the another communication service provider, wherein the first APN address is an APN address of the virtual gateway (vPGW) existing in the edge computing cloud 30 of the visited network (VPLMN), and the second APN address is an APN address for a PGW 80 existing in the home network (HPLMN) of the another communication service provider, which is mentioned in FIG. 2.

Figure 5:
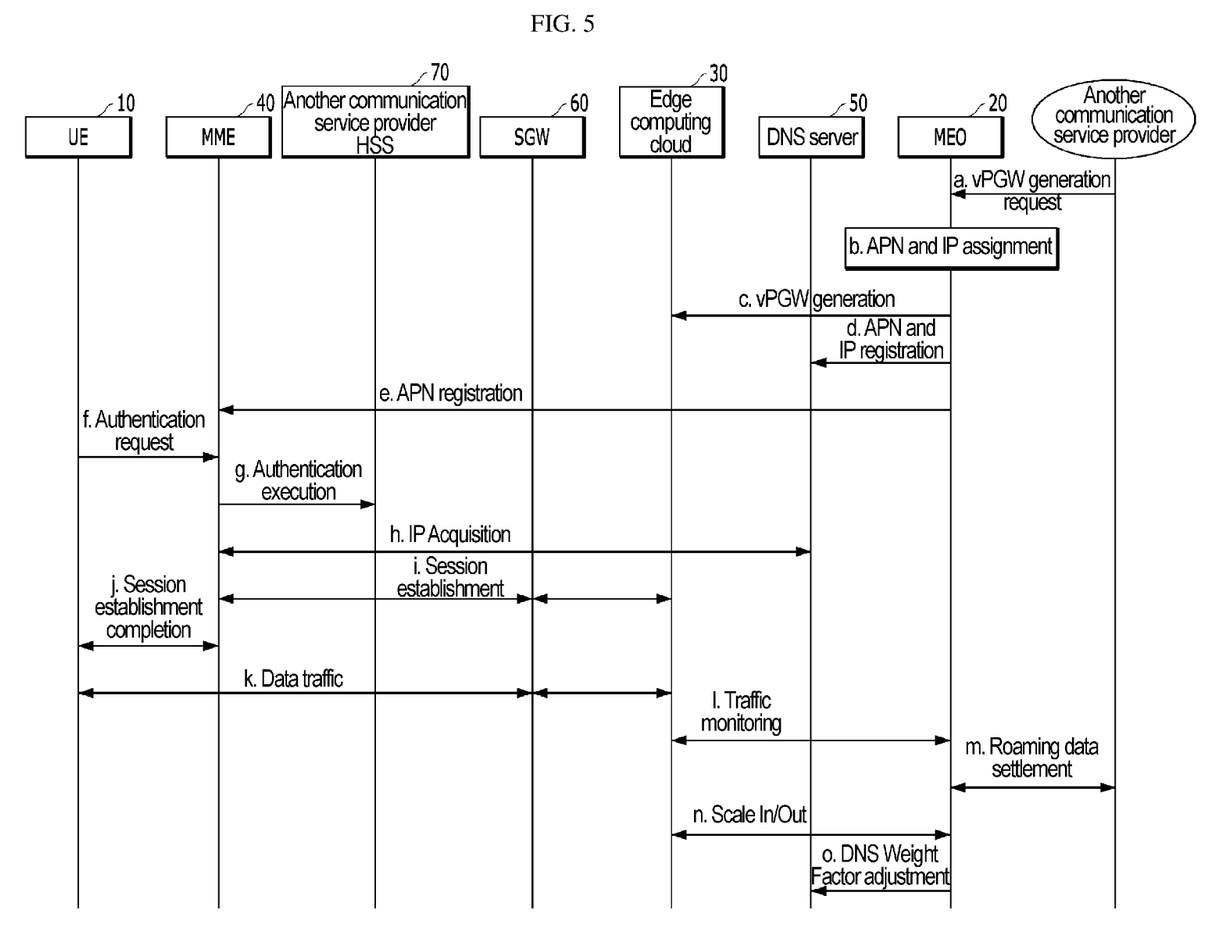
FIG. 5 is an exemplary diagram for describing a data roaming service procedure according to an embodiment of the present disclosure.

In FIG. 5, a procedure of generating a virtual gateway (vPGW) for another communication service provider by the generation unit 21 according to an embodiment of the present disclosure may be exemplarily identified.

That is, as shown in FIG. 5, when virtual gateway (vPGW) generation is requested by another communication service provider, the generation unit 21 may generate (a to c) a virtual gateway (vPGW) for processing a data roaming service for the another communication service provider on the edge computing cloud 30, by assigning a first APN address in a visited network (VPLMN) for the another communication service provider and an IP address mapped to the first APN address, in response to the request.

The generation unit 22 is configured to register a virtual gateway (vPGW) for another communication service provider.

More specifically, the registration unit 22 is configured to register, when a virtual gateway (vPGW) for another communication service provider has been generated, access information of the virtual gateway (vPGW) in the visited network (VPLMN).

That is, the registration unit 22 registers, in a visited network (VPLMN), the access information of the virtual gateway (vPGW) generated for the another communication service provider, thereby enabling a session for data traffic transfer to be established between the terminal 10 and the virtual gateway (vPGW) on the edge computing cloud 30 according to the access information registered in the visited network (VPLMN) when the terminal 10 accesses the visited network (VPLMN) to use a data roaming service.

To this end, the registration unit 22 registers the first APN address, which is a virtual gateway (vPGW) address of the another communication service provider, in the MME 40 of the visited network (VPLMN), and registers mapping information between the first APN address and an IP address mapped thereto in the DNS server 50 of the visited network (VPLMN).

During the registration of the first APN address in the MME 40 of the visited network (VPLMN), the registration unit 22 matches the first APN address to service provider identification information (e.g., MMC and MMC) of the another communication service provider and registers the same.

Registering the first APN address matched to the service provider identification information (e.g., MMC and MMC) of the another communication service provider is to reject a second APN address which is an APN address in a home network (HPLMN) of the another communication service provider requested by the terminal 10, and acquire, instead of the second APN address, the IP address matching the first APN address from the DNS server 50, so as to establish the session for data traffic transfer between the terminal 10 and the virtual gateway (vPGW) on the edge computing cloud 30, when the MME 40 identifies the service provider identification information (e.g., MMC and MMC) of the another communication service provider from the terminal 10 accessing the visited network (VPLMN).

When the access the terminal 10 to the visited network (VPLMN) is identified as mentioned above, the MME 40 performs authentication on the terminal 10 in association with the home subscriber server (HSS) 70 located in the home network (HPLMN) of the another communication service provider, and when the terminal 10 has been authenticated, establishes the session for data traffic transfer between the serving gateway (SGW) 60 of the visited network (VPLMN) and the virtual gateway (vPGW) of the another communication service provider, which is generated in the edge computing cloud 30, thereby enabling the data roaming service for the terminal 10 via the virtual gateway (vPGW) of the another communication service provider.

In this regard, in FIG. 5 exemplified above, it may be exemplarily identified that the registration unit 22 registers the virtual gateway (vPGW) in the visited network (VPLMN) so as to enable the data roaming service to be provided to the terminal 10, according to an embodiment of the present disclosure.

As shown in FIG. 5, when the virtual gateway (vPGW) for the another communication service provider has been generated via the preceding procedures of a to c, the registration unit 22 matches the first APN address, which is the virtual gateway (vPGW) address of the another communication service provider, to the service provider identification information (e.g., MMC and MMC), registers the same in the MME 40 of the visited network (VPLMN), and registers (d to e) mapping information between the first APN address and the IP address mapped thereto in the DNS server 50 of the visited network (VPLMN).

In this case, when the access of the terminal 10 to the visited network (VPLMN) is identified, the MME 40: performs authentication on the terminal 10 in association with the home subscriber server (HSS) 70 located in the home network (HPLMN) of the another communication service provider; when the terminal 10 has been authenticated, rejects the second APN address which is the APN address in the home network (HPLMN) of the another communication service provider requested by the terminal 10; acquires, instead of the second APN address, the IP address matching the first APN address from the DNS server 50; and establishes the session between the terminal 10 and the virtual gateway (vPGW) on the edge computing cloud 30, thereby enabling data traffic according to the use of the data roaming service to be transferred via the session.

The registration unit 22 is able to not only register the first APN address in the MME 40 of the visited network (VPLMN), but also delete the first APN address from the MME 40. To this end, the registration unit 22 transmits a GPRS tunneling protocol-control (GTP-C) message to or receives the same from the MME 40.

Figure 6:
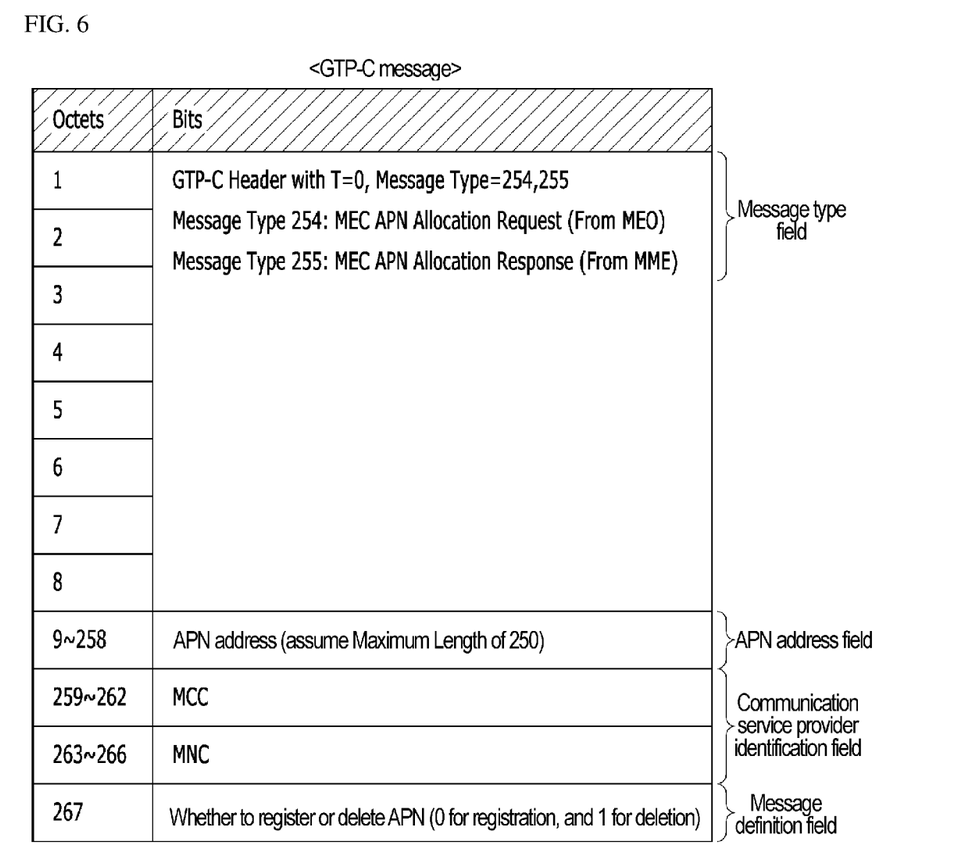
FIG. 6 is an exemplary diagram for describing a message structure according to an embodiment of the present disclosure.

The GTP-C message may be defined using, for example, "142-148" assigned for future usage of "MME to MME" or "248-255" assigned to an "Others" area.

In this regard, in FIG. 6, a structure of a GTP-C message according to an embodiment of the present disclosure may be exemplarily identified.

As shown in FIG. 6, a GTP-C message according to an embodiment of the present disclosure is defined to include a message type field for distinguishing transmission or reception of a message to the MME 40, an APN address field into which a first APN address is inserted, a communication service provider identification field into which service provider identification information (e.g., MCC and MNC) is inserted, a message definition field to identify that a message is for registration or deletion of the first APN address, and the like, thereby enabling not only the first APN address to be registered in the MME 40 of the visited network (VPLMN) but also the first APN address to be deleted from the MME 40.

The management unit 23 manages data traffic according to the use of a data roaming service.

More specifically, after a session is established between the terminal 10 and a virtual gateway (vPGW) on the edge computing cloud 30, the management unit 23 monitors data traffic according to the use of the roaming service, and processes settlement of roaming data with another communication service provider according to a monitoring result.

In addition, the management unit 23 adjusts (in/out) the scale of the virtual gateway (vPGW) on the edge computing cloud 30 or adjusts a DNS weight factor for the DNS server 50 according to the result of monitoring data traffic monitoring.

Adjustment (in/out) of the scale of the virtual gateway (vPGW) refers to adjusting the processing capability of the virtual gateway (vPGW) of the another communication service provider according to a load level of data traffic due to the use of the roaming service, and may be understood, for example, as that the virtual gateway (vPGW) on the edge computing cloud 30 is expanded to allow more terminals to access, or vice versa.

Adjustment of the DNS weight factor for the DNS server 50 may be understood, for example, as an operation in which a virtual gateway (vPGW)-specific weight for selecting one of virtual gateways (vPGWs) generated for another communication service provider on the edge computing cloud 30 is adjusted when an IP address matching to the first APN address is selected and replied from the MME 40, or an operation in which the weight for the virtual gateway (vPGW) on the edge computing cloud 30 is set to be very low so as to cause an IP address of the PGW 80 located in the home network (HLMN) of the another communication service provider to be replied when terminal is no longer allowed to access due to the excess of the capacity of the virtual gateway (vPGW) on the edge computing cloud 30.

For reference, for adjustment of the scale (in/out) and the DNS weight factor, a load state of the virtual gateway (vPGW) (CPU, memory, disk, or the number of concurrent sessions) and the capacity of the edge computing cloud may be considered.

For example, if it is determined that the virtual gateway (vPGW) can no longer receive a roaming subscriber due to the load state of the virtual gateway (vPGW) and the capacity of the edge computing cloud, an MME 40 MEC APN deallocation request/response may be exchanged to stop an APN change operation of the MME 40, thereby causing an additional inbound roamer to be linked to the home network PGW.

Here, the MEC APN deallocation request/response refers to the aforementioned GTP-C message, and may stop the APN change operation of the MME 40 by setting a field value of the message definition field to 1.

In this regard, in FIG. 5 exemplified above, it may be exemplarily identified that the management unit 23 manages data traffic according to the use of the data roaming service according to an embodiment of the present disclosure.

That is, as shown in FIG. 5, after the session is established between the terminal 10 and the virtual gateway (vPGW) on the edge computing cloud 30 via the preceding procedures of c to k, the management unit 23 may monitor data traffic according to the use of the roaming service so as to process settlement of roaming data with the another communication service provider according to a monitoring result (1-*m*).

The management unit 23 adjusts the DNS weight factor for the DNS server 50 or adjusts (in/out) the scale of the virtual gateway (vPGW) on the edge computing cloud 30 by applying the monitoring result of the procedure 1, thereby managing the quality of the data roaming service provided by the visited network (VPLMN).

As described above, based on the configuration of the edge computing management device 20 according to an embodiment of the present disclosure, the quality of data traffic can be guaranteed irrespective of the distance between countries and the quality of an interworking network by providing a data roaming service to the terminal 10, which enters the visited network (VPLMN), by using the edge computing cloud 30 that exists in the visited network (VPLMN) according to applying of the edge computing (MEC, multi-access edge computing) technology.

In particular, in an embodiment of the present disclosure, when a virtual gateway (vPGW) of a foreign communication service provider for a roaming service is generated on the edge computing cloud 30 of the visited network (VPLMN), establishment of a session may be supported between the terminal 10 and the virtual gateway (vPGW) by using existing network equipment that is outside the edge computing cloud 30.

Specifically, in an embodiment of the present disclosure, the virtual gateway (vPGW) is generated in the edge computing cloud 30 of the visited network (VPLMN) by assigning the first APN address, which is an APN address in the visited network (VPLMN) for the another communication service provider, and the IP address mapped to the first APN address. The first APN address is matched to service provider identification information of the another communication service provider and registered in the MME 40 of the visited network. Mapping information between the first APN address and the AP address is registered in the DNS server 50 of the visited network.

Accordingly, in an embodiment of the present disclosure, when the service provider identification information of the another communication service provider is identified from the terminal 10 accessing the visited network (VPLMN) to use the data roaming service, establishment of the session for data traffic transfer may be supported between the virtual gateway (vPGW) and the terminal 10 in association with the DNS server 50 and the MME 40 existing outside the edge computing cloud 30 by configuring, as a key value, the identified service provider identification information of the another communication service provider.

More specifically, when the service provider identification information of the another communication service provider is identified from the terminal 10 accessing the visited network (VPLMN) to use the data roaming service, the MME 40 existing outside the edge computing cloud 30 in the visited network (VPLMN) acquires, instead of the second APN address that is an APN address in the home network (HPLMN) of the another communication service provider requested by the terminal 10, the first APN address and the IP address matching thereto from the DNS server 50, so as to support establishment of the session between the terminal 10 and the virtual gateway (vPGW).

That is, an embodiment of the present disclosure proposes a detailed method for generating, in the edge computing cloud 30 of the visited network (VPLMN), a virtual gateway (vPGW) for the another communication service provider based on network function virtualization, and registering access information, which is assigned to the virtual gateway (vPGW), in network equipment to which the network function virtualization is not applied in the visited network (VPLMN). Through this, the session for data traffic transfer is able to be established between the virtual gateway (vPGW) and the terminal 10 in association with the network equipment located outside the edge computing cloud 30, when the virtual gateway (vPGW) of the another communication service provider is generated in the edge computing cloud 30 of the visited network (VPLMN).

Figure 7:
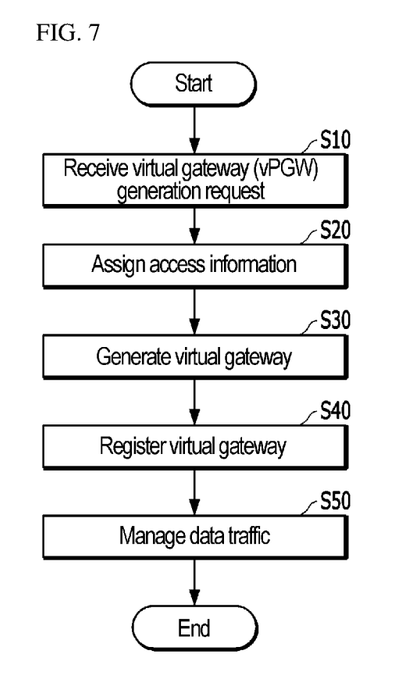
FIG. 7 is a flowchart for describing an operating method of an edge computing management device according to an embodiment of the present disclosure.

Hereinafter, an operating method of the edge computing management device 20 according to an embodiment of the present disclosure will be described with reference to FIG. 7.

First, the generation unit 21 assigns access information in the edge computing cloud 30 for another communication service provider, and generates (S10 to S30) a virtual gateway (vPGW) matching the access information assigned to the edge computing cloud 30, in response to a virtual gateway (vPGW) generation request from the another communication service provider.

The access information in the edge computing cloud 30, which is assigned to the another communication service provider, may include an access point name (APN) address (hereinafter, a first APN address) in a visited network (VPLMN) for the another communication service provider, and an IP address mapped to the first APN address.

Accordingly, the generation unit 21 may generate the virtual gateway (vPGW) for processing a data roaming service for the another communication service provider on the edge computing cloud 30, by assigning the first APN address in the visited network (VPLMN) for the another communication service provider and the IP address mapped to the first APN address, in response to the virtual gateway (vPGW) generation request from the another communication service provider.

In this way, the IP address assigned to the another communication service provider may include an IP address that matches one-to-one with the first APN address assigned to the another communication service provider, and an IP address pool which is a plurality of IP addresses assigned to terminals accessing the virtual gateway (vPGW) during the data roaming service.

Then, when the virtual gateway (vPGW) for the another communication service provider has been generated, the registration unit 22 registers the access information of the virtual gateway (vPGW) in the visited network (VPLMN) (S40).

That is, the registration unit 22 registers, in the visited network (VPLMN), the access information of the virtual gateway (vPGW) generated for the another communication service provider, thereby enabling the session for data traffic transfer to be established between the terminal 10 and the virtual gateway (vPGW) on the edge computing cloud 30 according to the access information registered in the visited network (VPLMN) when the terminal 10 accesses the visited network (VPLMN) to use a data roaming service.

To this end, the registration unit 22 registers the first APN address, which is a virtual gateway (vPGW) address of the another communication service provider, in the MME 40 of the visited network (VPLMN), and registers mapping information between the first APN address and the IP address mapped thereto in the DNS server 50 of the visited network (VPLMN).

During the registration of the first APN address in the MME 40 of the visited network (VPLMN), the registration unit 22 matches the first APN address to service provider identification information (e.g., MMC and MMC) of the another communication service provider.

Registering the first APN address matched to the service provider identification information (e.g., MMC and MMC) of the another communication service provider is to reject a second APN address which is an APN address in a home network (HPLMN) of the another communication service provider requested by the terminal 10, and acquire, instead of the second APN address, the IP address matching the first APN address from the DNS server 50, so as to establish the session for data traffic transfer between the terminal 10 and the virtual gateway (vPGW) on the edge computing cloud 30, when the MME 40 identifies the service provider identification information (e.g., MMC and MMC) of the another communication service provider from the terminal 10 accessing the visited network (VPLMN).

When the access of the terminal 10 to the visited network (VPLMN) is identified as mentioned above, the MME 40 performs authentication on the terminal 10 in association with the home subscriber server (HSS) 70 located in the home network (HPLMN) of the another communication service provider. When the terminal 10 has been authenticated, the MME 40 establishes the session for data traffic transfer between the serving gateway (SGW) 60 of the visited network (VPLMN) and the virtual gateway (vPGW) of the another communication service provider, which is generated in the edge computing cloud 30, thereby enabling the data roaming service for the terminal 10 via the virtual gateway (vPGW) of the another communication service provider.

Thereafter, after the session between the terminal 10 and the virtual gateway (vPGW) on the edge computing cloud 30 is established, the management unit 23 manages (S50) data traffic according to the use of the roaming service.

The management unit 23 may monitor the data traffic according to the use of the roaming service, and may process settlement of roaming data with the another communication service provider according to a monitoring result.

In addition, the management unit 23 adjusts a DNS weight factor for the DNS server 50 or adjusts (in/out) the scale of the virtual gateway (vPGW) on the edge computing cloud 30 according to the result of monitoring data traffic monitoring.

Adjustment (in/out) of the scale of the virtual gateway (vPGW) refers to adjusting the processing capability of the virtual gateway (vPGW) of the another communication service provider according to a load level of data traffic due to the use of the roaming service, and may be understood, for example, as that the virtual gateway (vPGW) on the edge computing cloud 30 is expanded to allow more terminals to access, or vice versa.

Adjustment of the DNS weight factor for the DNS server 50 may be understood, for example, as an operation in which a virtual gateway (vPGW)-specific weight for selecting one of virtual gateways (vPGWs) generated for another communication service provider on the edge computing cloud 30 is adjusted when an IP address matching to the first APN address is selected and replied from the MME 40, or an operation in which the weight for the virtual gateway (vPGW) on the edge computing cloud 30 is set to be very low so as to cause an IP address of the PGW 80 located in the home network (HLMN) of the another communication service provider to be replied when terminal access is no longer allowed due to the excess of the capacity of the virtual gateway (vPGW) on the edge computing cloud 30.

As described above, according to the operating method of the edge computing management device 20 according to an embodiment of the present disclosure, the quality of data traffic can be guaranteed irrespective of the distance between countries and the quality of an interworking network by providing a data roaming service to the terminal 10, which enters the visited network (VPLMN), by using the edge computing cloud 30 that exists in the visited network (VPLMN) according to applying of the edge computing (MEC, multi-access edge computing) technology.

The operating method of the edge computing management device 20 according to an embodiment of the present disclosure may be implemented in the form of program commands executable via various computer means, so as to be recorded in a computer-readable medium. The computer-readable medium may include each of program commands, data files, data structures, etc. or a combination thereof. The program commands recorded in the medium may be specially designed and configured for the present disclosure, or may be known and available to those skilled in the computer software field. Examples of the computer-readable recording media include magnetic media such as a hard disk, a floppy disk, and a magnetic tape, optical media such as CD-ROM and DVD, magneto-optical media such as a floptical disk, and a hardware device, such as ROM, RAM, and a flash memory, specially configured to store and perform program commands. Examples of the program commands include a high-level language code executable by a computer using an interpreter, etc., as well as a machine language code produced by a compiler. The aforementioned hardware device may be configured to operate as one or more software modules to perform operations of the present disclosure, and vice versa.

In the present disclosure, descriptions have been provided in detail with reference to preferred embodiments, but the present disclosure is not limited to the above-described embodiments, and the technical idea of the present disclosure extends to the range in which anyone skilled in the art, to which the present disclosure belongs, can make various changes or modifications without departing from the gist of the present disclosure, which is claimed in the following claims.

The invention claimed is:

1. An edge computing management hardware device comprising:
   a generation unit configured to generate a virtual gateway for processing a data roaming process for another communication service provider in an edge computing cloud of a visited network (VPLMN), and the generation unit is to generate the virtual gateway by assigning access information related to the virtual gateway; and a registration unit configured to register the access information related to the virtual gateway in the visited network for establishing a session for data traffic transfer between a terminal and the virtual gateway when the terminal accesses the visited network to use a data roaming service, wherein the generation unit is configured to generate the virtual gateway by assigning a first Access Point Name (APN) address for the virtual gateway and assigning an IP address mapped to the first APN address, wherein the first APN address is an APN address in the visited network for the another communication service provider, wherein the registration unit is configured to register the access information by:

matching the first APN address to service provider identification information of the another communication service provider and transmitting the matched first APN address and the service provider identification information to a Mobility Management Entity (MME) of the visited network for registration, and transmitting mapping information between the first APN address and the IP address to a Domain Name System (DNS) server of the visited network for registration.

2. The device of claim 1, wherein the MME is configured to, when the service provider identification information of the another communication service provider is identified from the terminal accessing the visited network, acquire an IP address matching the first APN address, instead of a second APN address that is an APN address in a home network (HPLMN) of the another communication service provider requested by the terminal, from the DNS server for establishing the session between the terminal and the virtual gateway.

3. The device of claim 1, wherein the MME is configured to authenticate the terminal in association with a home network (HPLMN) of the another communication service provider when access of the terminal to the visited network is identified, and acquire an IP address matching the first APN address from the DNS server when the terminal is authenticated, the acquired IP address for establishing the session between the terminal and the virtual gateway.

4. The device of claim 1, wherein the registration unit is configured to transmit a GPRS tunneling protocol-control (GTP-C) message to the MME or to receive the GTP-C message from the MME, wherein the GTP-C message comprises at least one of a message type field for distinguishing message transmission to the MME or message reception from the MME, an APN address field into which the first APN address is inserted, a communication service provider identification field into which the service provider identification information is inserted, and a message definition field for distinguishing that the message is for registration of the first APN address or for deletion of the first APN address.

5. The device of claim 1, further comprising:

a management unit configured to adjust, based on a result of monitoring data traffic between the terminal and the virtual gateway for the data roaming service, at least one of a number of the virtual gateways, a number of IP addresses assignable to the terminal by the virtual gateways, and a weight factor that is a weight for selection of the virtual gateway.

6. The device of claim 5, wherein the management unit is configured to determine whether session establishment is possible using the virtual gateway based on at least one of a load state of the virtual gateway and a capacity of the edge computing cloud and enable session establishment in association with a home network of the another communication service provider with respect to the data roaming service required in the visited network.

7. An operating method comprising:

generating a virtual gateway for processing a data roaming process for another communication service provider in an edge computing cloud of a visited network (VPLMN), the generating the virtual gateway includes assigning access information related to the virtual gateway; and registering the access information in the visited network for establishing a session for data traffic transfer between a terminal and the virtual gateway when the terminal accesses the visited network to use a data roaming service, wherein the assigning the access information includes assigning a first Access Point Name (APN) address and assigning an IP address mapped to the first APN address, wherein the first APN address is an APN address in the visited network for the another communication service provider, wherein the registering the access information includes:

matching the first APN address to service provider identification information of the another communication service provider and transmitting the matched first APN address and the service provider identification information to a Mobility Management Entity (MME) of the visited network for registration, and transmitting mapping information between the first APN address and the IP address to a Domain Name System (DNS) server of the visited network for registration.

8. The method of claim 7, wherein the MME is configured to, when the service provider identification information of the another communication service provider is identified from the terminal accessing the visited network, acquire an IP address matching the first APN address, instead of a second APN address that is an APN address in a home network (HPLMN) of the another communication service provider requested by the terminal, from the DNS server for establishing the session between the terminal and the virtual gateway.

9. The method of claim 7, wherein the MME is configured to authenticate the terminal in association with a home network (HPLMN) of the another communication service provider when access of the terminal to the visited network is identified, and acquire an IP address matching the first APN address from the DNS server when the terminal is authenticated, the acquired IP address for establishing the session between the terminal and the virtual gateway.

10. The method of claim 7, wherein the registering includes: transmitting a GPRS tunneling protocol-control (GTP-C) message to the MME or receiving the GTP-C message from the MME, wherein the GTP-C message comprises at least one of a message type field for distinguishing message transmission to the MME or message reception from the MME, an APN address field into which the first APN address is inserted, a communication service provider identification field into which the service provider identification information is inserted, and a message definition field for distinguishing that the message is for registration of the first APN address or for deletion of the first APN address.

11. The method of claim 7, further comprising:
adjusting, based on a result of monitoring data traffic between the terminal and the virtual gateway for the data roaming service, at least one of a number of the virtual gateways, a number of IP addresses assignable to the terminal by the virtual gateways, and a weight factor that is a weight for selection of the virtual gateway.

12. The method of claim 11, wherein the adjusting includes:
determining whether session establishment is possible using the virtual gateway based on at least one of a load state of the virtual gateway and a capacity of the edge computing cloud; and
enabling session establishment in association with a home network of the another communication service provider with respect to the data roaming service required in the visited network.

13. A non-transitory storage medium having stored therein a control program causing a computer to perform:
generating a virtual gateway for processing a data roaming process for another communication service provider in an edge computing cloud of a visited network (VPLMN), the generating of the virtual gateway includes assigning access information related to the virtual gateway; and
registering the access information related to the virtual gateway in the visited network for establishing a session for data traffic transfer between a terminal and the virtual gateway when the terminal accesses the visited network to use a data roaming service,
wherein the assigning of the access information includes assigning a first Access Point Name (APN) address and assigning an IP address mapped to the first APN address, wherein the first APN address is an APN address in the visited network for the another communication service provider,
wherein the registering includes:
matching the first APN address to service provider identification information of the another communication service provider and transmitting the matched first APN address and the service provider identification information to a Mobility Management Entity (MME) of the visited network for registration, and
transmitting mapping information between the first APN address and the IP address to a Domain Name System (DNS) server of the visited network for registration.

14. The non-transitory storage medium of claim 13, wherein the MME is configured to, when the service provider identification information of the another communication service provider is identified from the terminal accessing the visited network, acquire an IP address matching the first APN address, instead of a second APN address that is an APN address in a home network (HPLMN) of the another communication service provider requested by the terminal, from the DNS server for establishing the session between the terminal and the virtual gateway.

* * * * *